US012806763B2

(12) United States Patent
An et al.

(10) Patent No.: US 12,806,763 B2
(45) Date of Patent: Nov. 24, 2026

(54) HARMONIC DRIVE, METHOD OF MEASURING TORQUE IN HARMONIC DRIVE, AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Ran An, Santa Clara, CA (US); Juncai Peng, Shanghai (CN); Tingke Song, Shanghai (CN); Shiquan Wang, Shanghai (CN)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 483 days.

(21) Appl. No.: 18/272,864

(22) PCT Filed: Oct. 18, 2022

(86) PCT No.: PCT/CN2022/125810
§ 371 (c)(1),
(2) Date: Jul. 18, 2023

(87) PCT Pub. No.: WO2024/082116
PCT Pub. Date: Apr. 25, 2024

(65) Prior Publication Data

US 2024/0391092 A1 Nov. 28, 2024

(51) Int. Cl.
*B25J 9/10* (2006.01)
*B25J 13/08* (2006.01)
(Continued)

(52) U.S. Cl.
CPC ........... *B25J 9/1025* (2013.01); *B25J 13/085* (2013.01); *F16H 49/001* (2013.01); *G01L 3/14* (2013.01)

(58) Field of Classification Search
CPC ..... B25J 9/1025; B25J 13/085; F16H 49/001; F16H 2049/003; G01L 3/14; G01L 3/1457
See application file for complete search history.

(56) References Cited

U.S. PATENT DOCUMENTS 6,170,340 B1 1/2001 Horiuchi et al.
2003/0230151 A1 12/2003 Godler et al.
(Continued)

FOREIGN PATENT DOCUMENTS

CN 1807032 A * 7/2006
CN 1815156 A 8/2006
(Continued)

OTHER PUBLICATIONS

International Search Report and Written Opinion for International Application No. PCT/CN2022/125810 mailed Jun. 21, 2023.
(Continued)

*Primary Examiner* — Octavia Hollington
(74) *Attorney, Agent, or Firm* — Ballard Spahr LLP

(57) ABSTRACT

A harmonic drive includes: a wave generator; a circular spline provided with internal teeth; a flexible spline provided between the wave generator and the circular spline and configured to be engaged with the internal teeth of the circular spline; and a plurality sets of torque sensors. Each set of torque sensors includes a plurality of strain gauges, each set of torque sensors is respectively configured to measure torque transmitted by the harmonic drive during rotation of the flexible spline. Signals measured by each of the plurality sets of torque sensors include a torque ripple,
(Continued)

and the plurality sets of torque sensors are alternatively arranged. The harmonic drive further includes a processor configured to calculate a true torque transmitted by the harmonic drive based on signals measured by the plurality sets of torque sensors. The torque ripple is excluded from the true torque.

14 Claims, 4 Drawing Sheets

(51) Int. Cl.
*F16H 49/00* (2006.01)
*G01L 3/14* (2006.01)

(56) References Cited

U.S. PATENT DOCUMENTS

| | | | |
|---|---|---|---|
| 2004/0079174 A1 | 4/2004 | Horiuchi | |
| 2021/0060793 A1 * | 3/2021 | Wang | B25J 9/06 |
| 2022/0034392 A1 * | 2/2022 | Damerau | G01M 13/021 |

FOREIGN PATENT DOCUMENTS

| | | | | | |
|---|---|---|---|---|---|
| CN | 1817573 | A | | 8/2006 | |
| CN | 107398921 | A | | 11/2017 | |
| CN | 108858276 | A | | 11/2018 | |
| CN | 110220625 | A | | 9/2019 | |
| CN | 209458371 | U | | 10/2019 | |
| CN | 111037598 | A | | 4/2020 | |
| CN | 112513601 | A | | 3/2021 | |
| CN | 112543863 | A | | 3/2021 | |
| CN | 216666400 | U | | 6/2022 | |
| DE | 10317304 | A1 | | 12/2003 | |
| DE | 102020131588 | A1 | | 6/2022 | |
| EP | 2018494 | B1 | * | 7/2009 | F16H 49/001 |
| JP | S639801 | Y2 | * | 3/1988 | |
| JP | H09184777 | A | | 7/1997 | |
| JP | H10227704 | A | | 8/1998 | |
| JP | 2004198400 | A | | 7/2004 | |
| JP | 2016057266 | A | | 4/2016 | |
| JP | 2016080052 | A | | 5/2016 | |
| JP | 6348044 | B2 | * | 6/2018 | |
| JP | 2020060196 | A | | 4/2020 | |
| JP | 2022504667 | A | | 1/2022 | |
| KR | 20140066018 | A | * | 5/2014 | B25J 9/102 |
| KR | 20170027430 | A | * | 3/2017 | G01L 3/102 |

OTHER PUBLICATIONS

European Search Report for European Application No. 22962312.9 mailed Oct. 23, 2025.

Godler, et al., "Ripple Compensation for Torque Sensors Built Into Harmonic Drives", IEEE Transactions on Instruments and Measurement, vol. 50, No. 1, Feb. 2001, pp. 117-122.

Taghirad, et al., "Torque Ripple and Misalignment Torque Compensation for the Built-In Torque Sensor of Harmonic Drive Systems", IEEE Transactions on Instrumentation and Measurement, vol. 47, No. 1, Feb. 1998, pp. 309-315.

Taghirad, "Intelligent Built-In Torque Sensor for Harmonic Drive Systems", IEEE Instrumentation and Measurement Technology Conference, May 19-21, 1997, pp. 969-974.

Office Action for Japanese Application No. 2025-522051 mailed Feb. 17, 2026.

* cited by examiner

HARMONIC DRIVE, METHOD OF MEASURING TORQUE IN HARMONIC DRIVE, AND ROBOT

TECHNICAL FIELD

The present disclosure relates generally to the field of harmonic drives, and more particularly, to a harmonic drive, a method of measuring torque in a harmonic drive, and a robot.

BACKGROUND

In recent years, robot technology has maintained high-speed development and has been widely used in industrial production. Harmonic drives are commonly used in a robot as a speed reducing mechanism for reducing a rotational speed and increasing a torque, so as to adjust a moving speed and an output torque of a connecting arm of the robot, thereby realizing harmonic speed reducing transmission. Harmonic drives typically include a circular spline with internal teeth, a flexible spline, and a wave generator that deforms the flexible spline radially. As the wave generator rotates, the flexible spline generates a controllable elastic deformation, whereby the teeth of the flexible spline can engage the internal teeth of the circular spline to transmit movement and force.

Currently, in a joint between the connecting arms of the robot, in order to measure the output torque of the harmonic drive, it is considered that the harmonic drive is connected in series with an elastic element, and the measurement of the output torque is performed by arranging a torque sensor on the elastic element. However, this increases the number of parts and therefore is not conducive to miniaturization of the joint and cost reduction.

In addition, in other solutions, the purpose of measuring the output torque is also achieved by arranging torque sensors (e.g., strain gauges) inside the harmonic drive (e.g., on the flexible spline). However, since the strain gauges are usually arranged discretely inside the harmonic drive, the strain of each strain gauge and thus the measured strain value is not completely consistent, and a torque value converted from the strain value may be fluctuated, thereby affecting the measurement accuracy of the output torque.

SUMMARY

In order to overcome one or more of the above-mentioned disadvantages, the present disclosure provides a harmonic drive, a method of measuring the torque in the harmonic drive, and a robot, which can effectively eliminate the influence of the torque ripple in a signal measured by a torque sensor, so as to accurately measure the real torque in the harmonic drive.

One aspect of the present disclosure provides a harmonic drive including: a wave generator; a circular spline provided with internal teeth; a flexible spline provided between the wave generator and the circular spline and configured to be engaged with the internal teeth of the circular spline; a plurality sets of torque sensors, wherein each set of the torque sensors includes a plurality of strain gauges, each set of torque sensors is respectively configured to measure torque transmitted by the harmonic drive during rotation of the flexible spline, wherein signals measured by each set of torque sensors include a torque ripple, and the plurality sets of torque sensors are alternatively arranged; and a processor configured to calculate a true torque transmitted by the harmonic drive based on signals measured by the plurality sets of torque sensors, wherein the torque ripple is excluded from the true torque.

In one embodiment, the plurality sets of torque sensors include a first set of torque sensors including four strain gauges and a second set of torque sensors including four strain gauges, the strain gauges in the first set of torque sensors and the strain gauges in the second set of torque sensors are alternatively arranged at an angle of 45 degrees.

In one embodiment, the harmonic drive further includes an angle measuring device configured to measure an angle of the wave generator relative to the flexible spline during rotation of the flexible spline.

In one embodiment, the processor calculates the real torque according to the following equation:

$$\tau_o = \frac{(\tau_1 + \tau_2)}{1 - \tan(2\theta)}$$

where $\tau_o$ is the real torque transmitted by the harmonic drive, $\tau_1$ is a torque value measured by the first set of torque sensors, $\tau_2$ is a torque value measured by the second set of torque sensors, and $\theta$ is the angle of the wave generator relative to the flexible spline.

In one embodiment, the angle measuring device includes a first angle sensor configured to measure an angle of the wave generator relative to the circular spline during rotation of the flexible spline, and a second angle sensor configured to measure an angle of the flexible spline relative to the circular spline during rotation of the flexible spline, such that the angle measuring device is capable of measuring the angle of the wave generator relative to the flexible spline during rotation of the flexible spline.

In one embodiment, the plurality sets of torque sensors includes a first set of torque sensors, a second set of torque sensors, and a third set of torque sensors, the first set of torque sensors includes four strain gauges, the second set of torque sensors includes four strain gauges, and the third set of torque sensors includes four strain gauges, the strain gauges in the first set of torque sensors, the strain gauges in the second set of torque sensors, and the strain gauges in the third set of torque sensors are alternatively arranged at an angle of 30 degrees, wherein each strain gauge in the second set of torque sensors is arranged 30 degrees ahead of an adjacent strain gauge in the first set of torque sensors, and each strain gauge in the third set of torque sensors is arranged 30 degrees behind an adjacent strain gauge in the first set of torque sensors.

In one embodiment, the processor calculates the real torque according to the following equation:

$$\tau_o = \tau_5 + \tau_6 - \tau_4$$

where $\tau_o$ is the real torque transmitted by the harmonic drive, $\tau_4$ is a torque value measured by the first set of torque sensors, $\tau_5$ is a torque value measured by the second set of torque sensors, $\tau_6$ is a torque value measured by the third set of torque sensors, and $\tau_o$ is an output torque value of the harmonic drive.

In one embodiment, the processor calculates the real torque according to the following equation:

$$\tau_o = \tau_4 - \tau_{pr}\cdot\sin(2\theta) = \tau_4 - \left(\frac{\tau_4 - \tau_{5'}}{\sin(2\theta) - \sin(2(\theta - (30^\circ + \Delta\alpha)))} \text{ or } \frac{\tau_4 - \tau_{6'}}{\sin(2\theta) - \sin(2(\theta + (30^\circ + \Delta\beta)))}\right)\sin(2\theta)$$

where $\tau_o$ is the real torque transmitted by the harmonic drive, $\tau_4$ is a torque value measured by the first set of torque sensors, $\tau_{5'}$ is a torque value measured by the second set of torque sensors, $\tau_{6'}$ is a torque value measured by the third set of torque sensors, $\Delta\alpha$ is an angular deviation between the second set of torque sensors and the first set of torque sensors, and $\Delta\beta$ is an angular deviation between the third set of torque sensors and the first set of torque sensors.

In one embodiment, each set of torque sensors is provided on the flexible spline and arranged surrounding an axis of the flexible spline.

In one embodiment, the flexible spline includes: a body part; a toothed part provided at one end of the body part and configured to be engaged with the inner teeth of the circular spline; and a flange extending radially outwardly from an end of the body part opposite the toothed part. wherein the plurality sets of torque sensors are provided on at least one of an inner side of the flexible spline, an outer side of the body part, a side of the flange facing the toothed part, and a side of the flange facing away from the toothed part.

In one embodiment, the wave generator, the circular spline, and the flexible spline are arranged coaxially.

In one embodiment, the strain gauges are made of polyvinylidene fluoride, or a material suitable for Hall sensors, capacitive sensors.

In one embodiment, the strain gauges are made by screen printing.

In one embodiment, the harmonic drive further includes a Kalman filter.

Another aspect of the present disclosure provides a method of measuring torque in a harmonic drive. The harmonic drive includes: a wave generator; a circular spline provided with internal teeth; a flexible spline provided between the wave generator and the circular spline and configured to be engaged with the internal teeth of the circular spline; a plurality sets of torque sensors, wherein each set of torque sensors includes a plurality of strain gauges, and the plurality sets of torque sensors are alternatively arranged; and a processor. The method includes steps of: measuring torque transmitted by the harmonic drive during rotation of the flexible spline by each set of torque sensors, wherein the signals measured by each set of torque sensors contain a torque ripple; and calculating, by the processor, a real torque transmitted by the harmonic drive based on the signals measured by the plurality sets of torque sensors, wherein the torque ripple is excluded from the true torque.

Yet another aspect of the present disclosure provides a robot including a plurality of connecting arms, any adjacent two connecting arms are pivotally connected by a robot joint, and the robot joint includes any of the harmonic drives described above.

BRIEF DESCRIPTION OF THE DRAWINGS

The accompanying drawings, which form a part of the disclosure, provide a further understanding of the disclosure, and illustrative embodiments of the disclosure and the description thereof explain the disclosure, and are not to be construed as unduly limiting the disclosure.

In order to explain the technical solutions in the embodiments of the present disclosure more clearly, the following will introduce briefly the drawings used in the description of the embodiments. Obviously, the drawings in the following description are merely several embodiments of the present disclosure. For those skilled in the art, other drawings can be obtained based on these drawings without creative work.

DESCRIPTION OF REFERENCE NUMBERS

Figure 1:
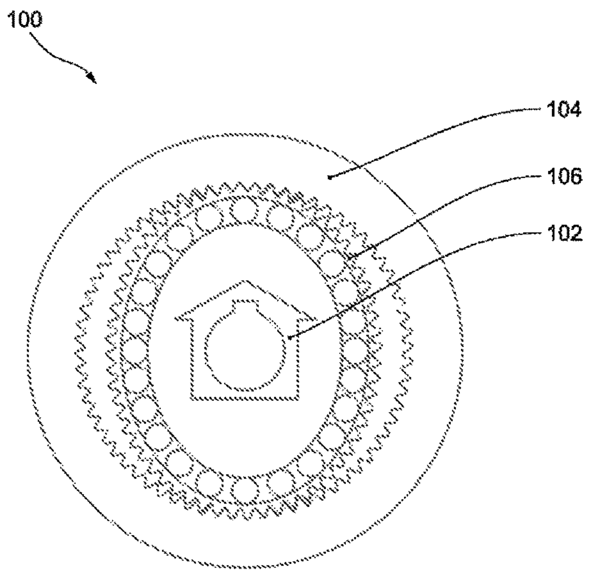
FIG. 1 is an axial cross-sectional view of a harmonic drive according to an embodiment of the present disclosure.

100 harmonic drive
102 wave generator
104 circular spline
106 flexible spline
108 transmission input shaft
110 stator
112 rotor
114 transmission output shaft
116 output component
118 first reading head
120 first disk
122 second reading head
124 second disk
202 body part
204 toothed part
206 flange
208 strain gauge
300 robot
301 connecting arm
302 robot joint
303 robot grasping jaw
A1, A2, A3, A4 regions
S100-S200 step

DETAILED DESCRIPTION OF THE EMBODIMENTS

In order that the above objects, features, and advantages of the present disclosure may be more readily understood, reference will now be made in detail to the accompanying drawings. In the following description, numerous specific details are set forth in order to facilitate a thorough understanding of the present disclosure. However, the disclosure can be embodied in many other ways than those described herein, and those skilled in the art can make similar modifications without departing from the spirit of the disclosure, and thus the disclosure is not limited to the specific embodiments disclosed below.

It should be understood that, although the terms “first” “second” and the like may be used herein to describe various elements, it is not intended to indicate any order, number, or importance, but merely to distinguish between different components. These terms are used only to distinguish one element from another. For example, the first element may be referred to as the second element without departing from the scope of the present disclosure, and similarly, the second element may be referred to as the first element. “Comprising” or “including” and the like are intended to mean that an element or article preceding the word encompasses an element or article recited after the word and equivalents thereof, without excluding other elements or articles.

Unless defined otherwise, all technical and scientific terms used herein have the same meaning as commonly understood by one of ordinary skill in the art to which this disclosure belongs. The terms used in the description of the present disclosure are merely used for the purpose of describing specific embodiments, and are not intended to limit the present disclosure. The term “and/or” used herein includes any and all combinations of one or more related listed items.

Reference to “embodiments” herein means that a specific feature, structure, or characteristic described in conjunction with the embodiments may be included in at least one embodiment of the present disclosure. An appearance of a phrase in various places in the specification does not necessarily refer to the same embodiment, nor is it an independent or alternative embodiment mutually exclusive with other embodiments. Those skilled in the art clearly and implicitly understand that, the embodiments described herein can be combined with other embodiments.

Referring now to FIG. 1, a harmonic drive 100 according to an embodiment of the present disclosure will be described. FIG. 1 is a cross-sectional view of the harmonic drive 100 taken along an axial direction of the harmonic drive 100 according to an embodiment of the present disclosure.

In FIG. 1, the harmonic drive 100 includes: a wave generator 102, such as a cam; a circular spline 104 provided with internal teeth; and a flexible spline 106 provided between the wave generator 102 and the circular spline 104 and configured to be engaged with the internal teeth of the circular spline 104. Further, the wave generator 102, the circular spline 104, and the flexible spline 106 may be arranged substantially coaxially.

Figure 2:
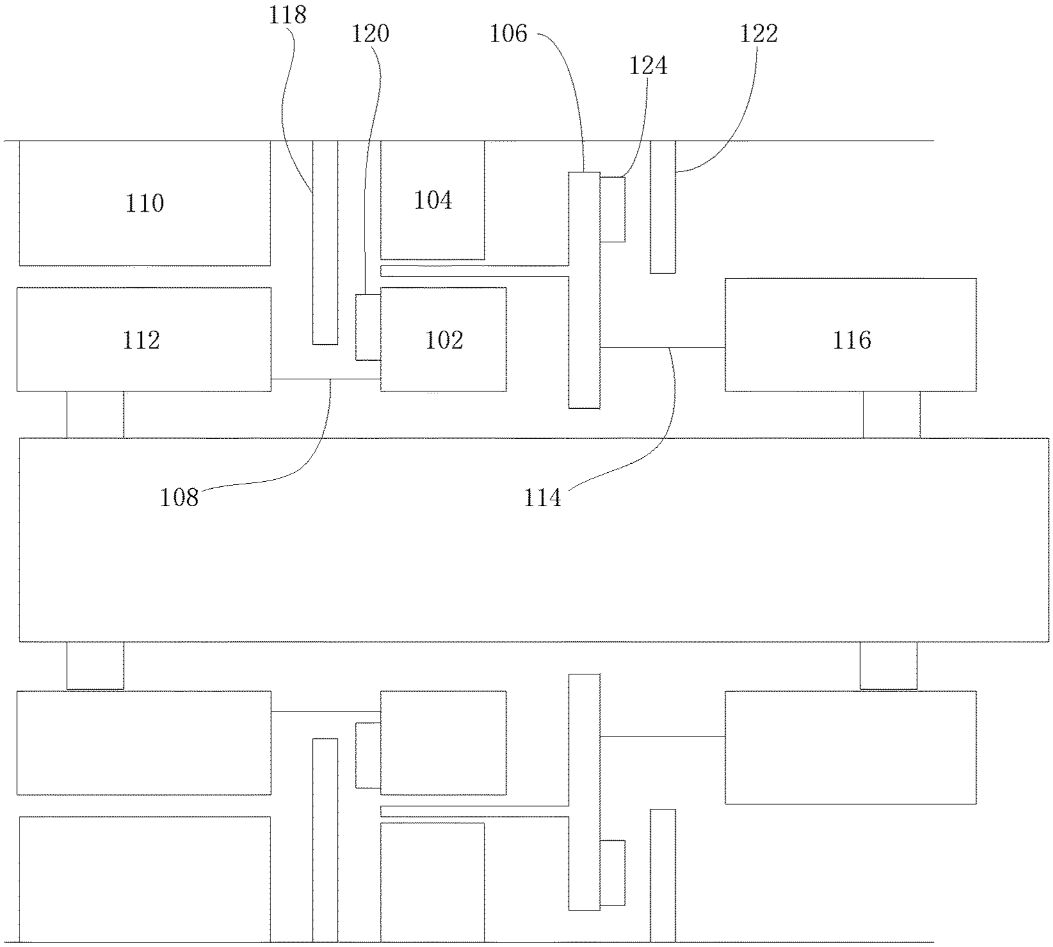
FIG. 2 is a schematic structural view of a robot joint equipped with the harmonic drive according to the embodiment of the present disclosure.

Referring to FIG. 2, FIG. 2 is a schematic structural view of a robot joint equipped with the harmonic drive 100 according to the embodiment of the present disclosure. As an example, in the robot joint equipped with the harmonic drive 100, in order to realize, for example, a deceleration transmission, the wave generator 102 of the harmonic drive 100 is generally connected to one end of the transmission input shaft 108, and a motor is mounted at the other end of the transmission input shaft 108. In the example illustrated in FIG. 2, the motor includes a stator 110 and a rotor 112, and the stator 110 may be secured to a housing of the robot joint by any suitable means. On the other hand, the flexible spline 106 of the harmonic drive 100 is connected to one end of the transmission output shaft 114, and an output component 116 of the robot joint (for example, an end-effector) may be mounted at the other end of the transmission output shaft 114. In addition, the circular spline 104 of the harmonic drive 100 may also be secured to the housing of the robot joint by any suitable means.

In general, the harmonic drive 100, when used as a reducer, may be configured such that the wave generator 102 is active, the circular spline 104 is fixed and the flexible spline 106 is configured for output. Of course, it should be understood that, in some embodiments, the flexible spline 106 may be fixed and the circular spline 104 may be configured for output.

Specifically, during operation where the harmonic drive 100 is used for deceleration transmission, the wave generator 102 rotates along with the rotor 112 of the motor via the transmission input shaft 108, and the flexible spline 106 is deformed periodically and radially during rotation with the wave generator 102, such that the teeth of the flexible spline 106 are engaged with corresponding teeth on the circular spline 104, thereby transmitting torque. Further, rotational speed of the transmission output shaft 114 is reduced by the harmonic drive 100, so that the deceleration transmission can be realized.

Figure 3:
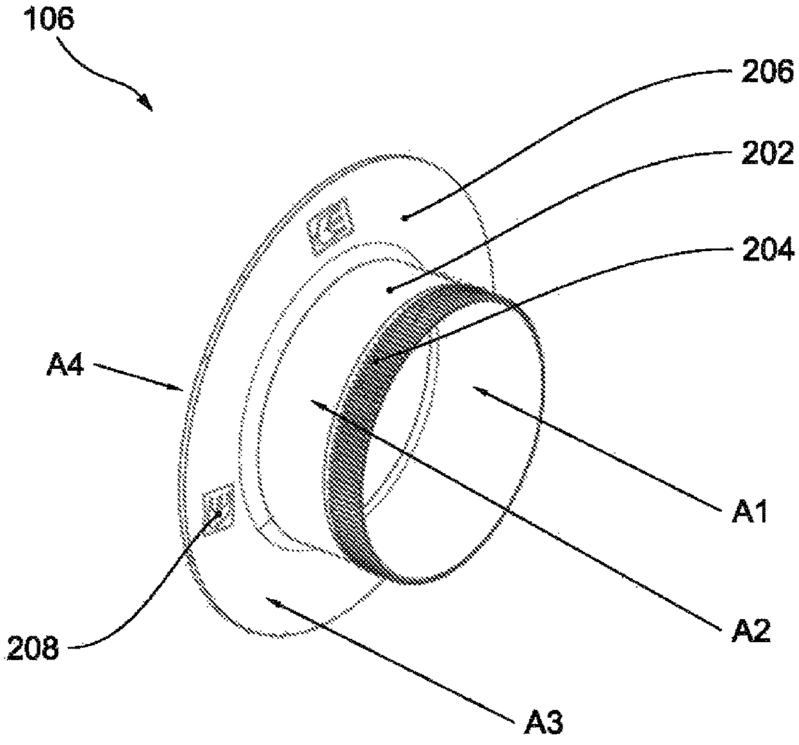
FIG. 3 is a schematic perspective view of a flexible spline of the harmonic drive according to the embodiment of the present disclosure.

Referring now to FIG. 3, the flexible spline 106 according to the embodiment of the present disclosure will be described. FIG. 3 is a schematic perspective view of the flexible spline 106 of the harmonic drive 100 according to the embodiment of the present disclosure.

In FIG. 3, the flexible spline 106 according to the embodiment of the present disclosure includes: a body part 202; a toothed part 204 provided at one end of the body part 202 and configured to be engaged with the inner teeth of the circular spline 104; and a flange 206 extending radially and outwardly from an end of the body part 202 opposite the toothed part 204. As shown in FIG. 3, the flexible spline 106 itself is of a cylindrical structure and is thin-walled, such that the flexible spline 106 may deform elastically. As described above, during operation of the harmonic drive 100, the flexible spline 106 can deform periodically and radially by the action of the wave generator 102.

Further, in one embodiment of the present disclosure, the harmonic drive 100 further includes a plurality sets of torque sensors and a processor (not shown). Each set of the torque sensors includes a plurality of strain gauges. Each set of the torque sensors is respectively configured to measure torque transmitted by the harmonic drive during rotation of the flexible spline 106. Signals measured by each of the plurality sets of torque sensors include a torque ripple, and the plurality sets of torque sensors are alternatively arranged. The processor is configured to calculate a true torque transmitted by the harmonic drive based on signals measured by the plurality sets of torque sensors, and the torque ripple is excluded from the true torque.

In embodiments of the present disclosure, each set of torque sensors can be provided on the flexible spline 106 and arranged surrounding an axis of the flexible spline 106. Thus, the plurality sets of torque sensors and the plurality of strain gauges can lie on the same plane relative to the axis of the flexible spline 106. Specifically, as shown in FIG. 3, the plurality sets of torque sensors and thus the plurality of strain gauges 208 may be provided, for example, in at least one of a region A1 of the inner side of the flexible spline 106, a region A2 of the outer side of the body part 202, a region A3 of the flange 206 on a side facing the toothed part 204, and a region A4 of the flange 206 on a side facing away from the toothed part 204.

Hereinafter, for ease of explanation, the plurality sets of torque sensors are provided in the region A3 of the flange 206 on the side facing the toothed part 204, but the present disclosure is not limited hereto.

Figure 4:
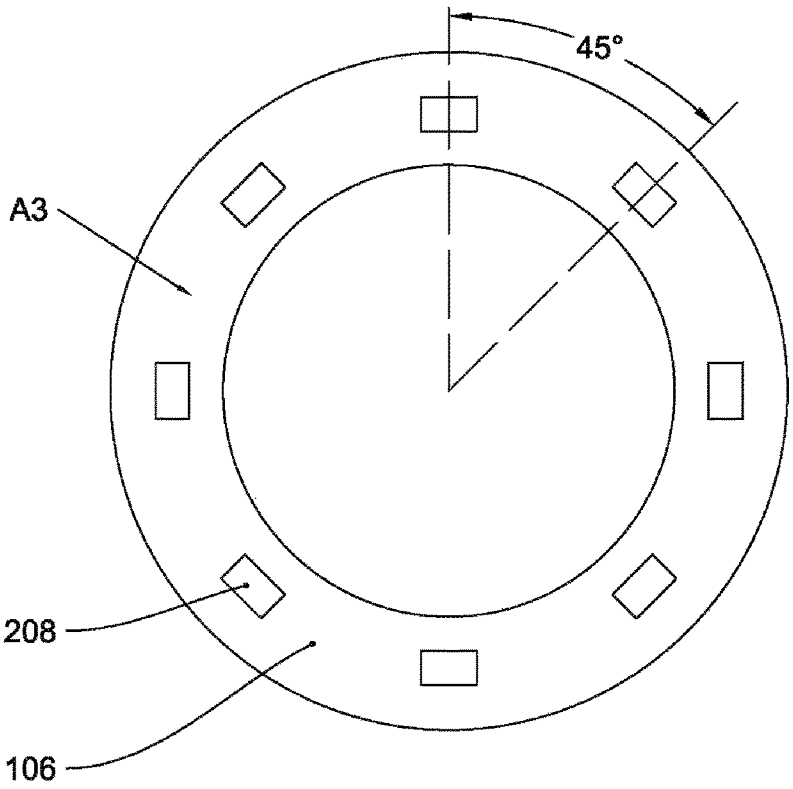
FIG. 4 is a schematic view of an arrangement pattern of two sets of torque sensors according to the embodiment of the present disclosure.

Referring now to FIG. 4, an arrangement pattern of two sets of torque sensors according to an embodiment of the present disclosure will be described.

In an embodiment of the present disclosure, the plurality sets of torque sensors include a first set of torque sensors including four strain gauges and a second set of torque sensors including four strain gauges. The strain gauges in the first set of torque sensors and the strain gauges in the second set of torque sensors are alternatively arranged at an angle of 45 degrees.

Specifically, as shown in FIG. 4, in the region A3 on the side of the flange 206 facing the toothed part 204, eight strain gauges 208 are uniformly and annularly arranged relative to the axis of the flexible spline 106. That is, each strain gauge 208 has equal radial distance relative to the axis of the flexible spline 106, and adjacent strain gauges 208 are rotated 45 degrees about the axis of the flexible spline 106. The eight strain gauges 208 are divided into two groups, i.e., a first set of torque sensors and a second set of torque sensors, and thus the first set of torque sensors and the second set of torque sensors are alternatively arranged. For example, referring to FIG. 4, the strain gauge 208 located at top of FIG. 4 is regarded as the first one, and the others are counted in the clockwise direction. Then, the first set of torque sensors may include a first, third, fifth, and seventh of the eight strain gauges 208, while the second set of torque sensors may include a second, fourth, sixth, and eighth of the eight strain gauges 208. Thus, each set of torque sensors includes four strain gauges 208. Further, the four strain gauges 208 included in each set of torque sensors constitute a Wheatstone bridge to form a detection circuit to measure the torque transmitted by the harmonic drive 100 during rotation of the flexible spline 106.

Further, in some embodiments, the strain gauge 208 may be, for example, a Rosette-type strain gauge. As described above, by using eight strain gauges and arranging them symmetrically, the influence of the torque ripple in the signal measured by the torque sensor can be effectively eliminated (which will be described specifically below), such that the measurement sensitivity can be effectively improved, and thus the accuracy of the measurement can be improved. Further, the strain gauges 208 may be made of, for example, polyvinylidene fluoride (PVDF), or may be made of other materials suitable for Hall sensors, capacitive sensors. Further, the strain gauges 208 may be made, for example, by screen printing and then mounted on the harmonic drive 100. Alternatively, the strain gauges 208 may also be formed directly on the harmonic drive 100 by screen printing.

Referring again to FIG. 2, in some embodiments, the harmonic drive 100 may further include an angle measuring device configured to measure an angle θ of the wave generator 102 relative to the flexible spline 106 during rotation of the flexible spline 106.

Further, the angle measuring device may include, for example, a first angle sensor configured to measure an angle of the wave generator 102 relative to the circular spline 104 (or a housing or other component fixedly connected to the circular spline 104) during rotation of the flexible spline 106, and a second angle sensor configured to measure the angle of the flexible spline 106 relative to the circular spline 104 (or a housing or other component fixedly connected to the circular spline 104) during rotation of the flexible spline 106, thereby measuring the angle θ of the wave generator 102 relative to the flexible spline 106 during rotation of the flexible spline 106.

Specifically, in the example illustrated in FIG. 2, the first angle sensor includes a first read head 118 provided on a housing fixedly connected to the circular spline 104 and a first disk 120 provided on the wave generator 102. In addition, the second angle sensor includes a second read head 122 provided on a housing fixedly connected to the circular spline 104 and a second disk 124 provided on the flexible spline 106. As shown in FIG. 3, the second disk 124 may be provided, for example, in the region A4 of the flange 206 on the side away from the toothed part 204. Thus, during rotation of the flexible spline 106, the processor can acquire angle data of each of the flexible spline 106 and the wave generator 102 relative to the housing by the first reading head 118 and the second reading head 122, so that the angle θ of the wave generator 102 relative to the flexible spline 106 can be acquired.

In addition, it should be appreciated that while in the example of FIG. 2, both the first disk 120 and the second disk 124 are provided on the housing, the first disk 120 and the second disk 124 may also be provided directly on the circular spline 104.

Furthermore, it should be understood that although in the example of FIG. 2 the angle measuring device includes two angle sensors, the angle measuring device may include only one angle sensor. For example, a read head and a disk of the angle sensor are respectively provided on the wave generator 102 and the flexible spline 106.

In addition, in some embodiments, the harmonic drive 100 may also include a Kalman filter for eliminating high-frequency measurement signal components to further improve measurement accuracy.

Figure 5:
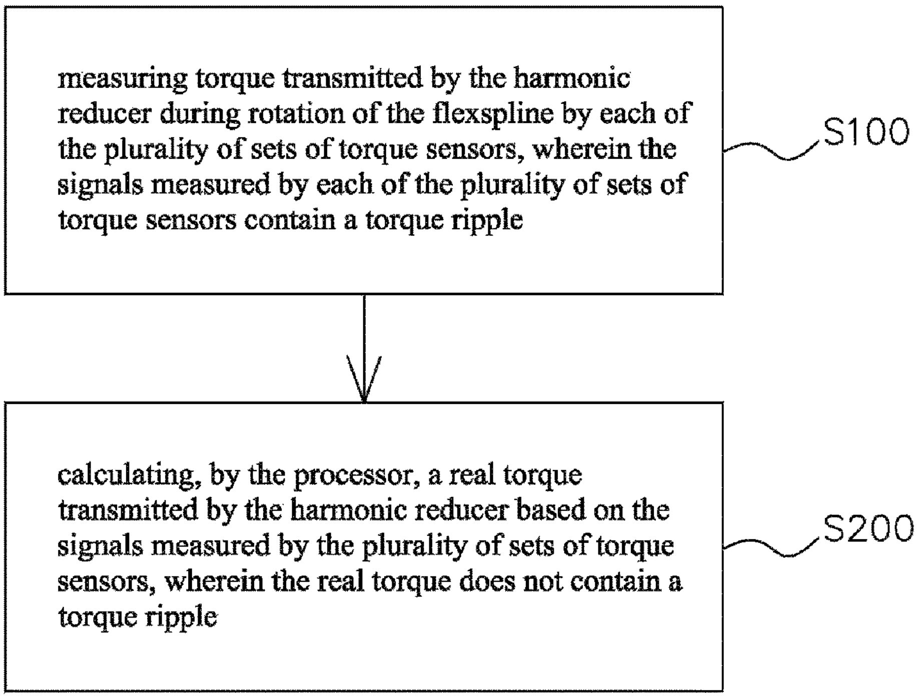
FIG. 5 is a flow chart of a method of measuring true torque in the harmonic drive according to the embodiment of the present disclosure.

Referring now to FIG. 5, FIG. 5 is a flow chart of a method of measuring true torque in the harmonic drive according to an embodiment of the present disclosure. As shown, another aspect of the present disclosure provides the method of measuring torque in the harmonic drive. As described above, the harmonic drive includes: the wave generator; the circular spline provided with internal teeth; the flexible spline provided between the wave generator and the circular spline and configured to be engaged with the internal teeth of the circular spline; the plurality sets of torque sensors; and the processor. Each set of torque sensors includes a plurality of strain gauges, and the plurality sets of torque sensors are alternatively arranged.

The method may include steps of:

S100, measuring torque transmitted by the harmonic drive during rotation of the flexible spline by each set of the torque sensors, wherein the signals measured by each set of the torque sensors include a torque ripple; and S200, calculating, by the processor, a real torque transmitted by the harmonic drive based on the signals measured by the plurality sets of torque sensors, wherein the torque ripple is excluded from the true torque.

Next, referring to FIG. 4, the strain gauge 208 located at top of FIG. 4 is regarded as the first one, and the others are counted in the clockwise direction. The first set of torque sensors includes a second, fourth, sixth, and eighth of the eight strain gauges 208, and the second set of torque sensors includes a first, third, fifth, and seventh of the eight strain gauges 208. Thus, each set of torque sensors includes four strain gauges 208. The following description is given by way of this example, but is not limited herein.

Thus, the four strain gauges 208 included in each set of torque sensors constitute a Wheatstone bridge to form a detection circuit to measure the torque transmitted by the harmonic drive during rotation of the flexible spline.

As described above, the torque ripple contained in the signals measured by the first set of torque sensors and the second set of torque sensors is related to the angle θ of the wave generator relative to the flexible spline, as shown in the following equation (1):

$$\tau_r = \tau_{pr} \cdot \sin(2\theta) \qquad \text{equation (1)}$$

where $\tau_r$ is a torque ripple contained in the signal measured by the first set of torque sensors (or the second set of torque sensors), and $\tau_{pr}$ is a torque ripple peak value in the torque ripple.

As described above, since the strain gauges in the first set of torque sensors and the strain gauges in the second set of torque sensors are alternatively arranged at an angle of 45 degrees, there is a phase difference in the torque value measured by the strain gauges in the two sets of torque sensors. Assuming that the second set of torque sensors is 45 degrees behind the first set of torque sensors, the torque values measured by the first set of torque sensors and the second set of torque sensors are as shown in equations (2) and (3) below, respectively, $$\tau_1 = \tau_o + \tau_r = \tau_o + \tau_{pr} \cdot \sin(2\theta) \qquad \text{equation (2)}$$

$$\tau_2 = \tau_o + \tau_{r-45°} = \tau_o + \tau_{pr} \cdot \sin(2(\theta - 45°)) = \tau_o + \tau_{pr} \cdot \cos(2\theta) \qquad \text{equation (3)}$$

where $\tau_1$ is a torque value measured by the first set of torque sensors, $\tau_2$ is a torque value measured by the second set of torque sensors, and $\tau_o$ is an output torque value of the harmonic drive.

It should be noted that, the angle θ herein is a relative angle between the wave generator and the flexible spline obtained by taking a position of any strain gauge in the first set of torque sensors as the reference point on the flexible spline and taking a point on a long axis of the elliptical wave generator as the reference point. In a condition that other points on the wave generator and the flexible spline are selected as reference points in practical applications, the above-mentioned equation will be adjusted accordingly, but the principle thereof is not changed, and the principle and spirit of the present disclosure can still be applied.

Thereafter, the processor calculates a real torque transmitted by the harmonic drive based on torque values measured by the first set of torque sensors and the second set of torque sensors, and the real torque can contain no torque ripples. Specifically, $\tau_o$ can be calculated by the following equation (4) based on the above-mentioned equations (2) and (3).

$$\tau_o = \frac{(\tau_1 + \tau_2)}{2} - \frac{1}{2}(\sin(2\theta) + \cos(2\theta))\frac{(\tau_1 - \tau_2)}{(\sin(2\theta) - \cos(2\theta))} = (\tau_1 + \tau_2)\frac{(-\cos(2\theta))}{(\sin(2\theta) - \cos(2\theta))} \qquad \text{equation (4)}$$

Therefore, the output torque value of the harmonic drive may be shown in equation (5) below.

$$\tau_o = \frac{(\tau_1 + \tau_2)}{1 - \tan(2\theta)} \qquad \text{equation (5)}$$

Furthermore, the method may further include the steps of eliminating the high-frequency measurement signal components by using a Kalman filter, thereby correcting errors and further improving the measurement accuracy.

Figure 6:
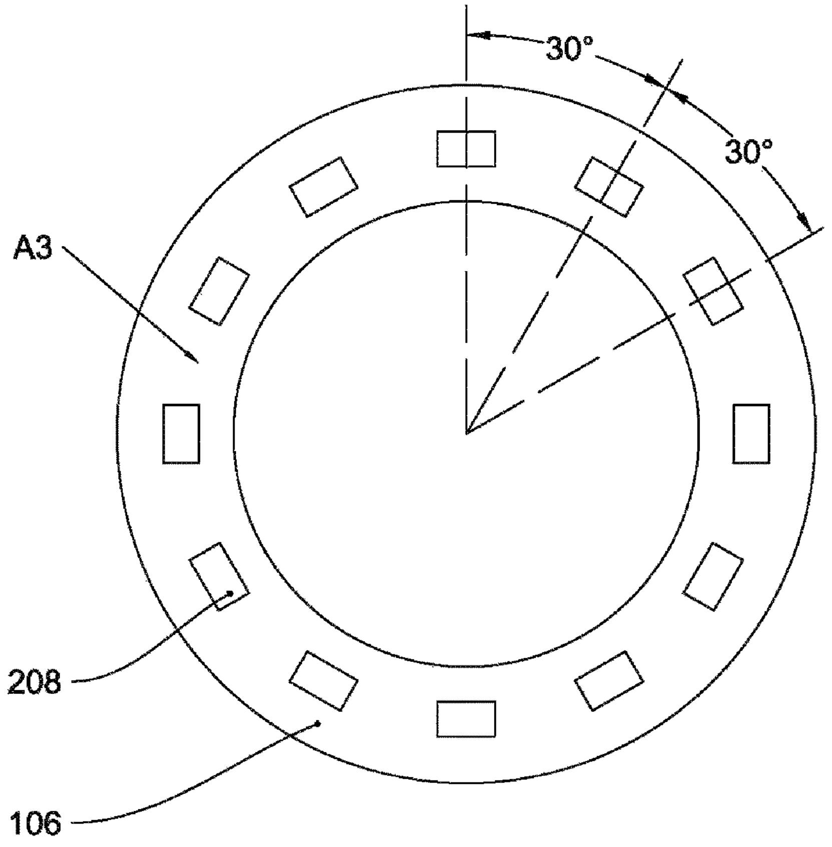
FIG. 6 is a schematic view of an arrangement pattern of three sets of torque sensors according to another embodiment of the present disclosure.

Next, referring now to FIG. 6, an arrangement pattern of three sets of torque sensors according to another embodiment of the present disclosure will be described. As shown, in this embodiment, in the region A3 of the flange 206 on the side facing the toothed part 204, twelve strain gauges 208 are uniformly and annularly arranged relative to the axis of the flexible spline 106. That is, each strain gauge 208 has equal radial distance relative to the axis of the flexible spline 106, and adjacent strain gauges 208 are rotated 30 degrees about the axis of the flexible spline 106. The twelve strain gauges 208 are divided into three sets, namely, a first set of torque sensors, a second set of torque sensors, and a third set of torque sensors, and these three sets of torque sensors are alternatively arranged at an angle of 30 degrees. For example, referring to FIG. 6, the strain gage 208 right above in the figure is assumed as the first one, and the others are counted in the clockwise direction. Then, the first set of torque sensors may include a third, sixth, ninth, and twelfth of the twelve strain gauges 208, the second set of torque sensors may include a second, fifth, eighth, and eleventh of the twelve strain gauges 208, and the third set of torque sensors may include a first, fourth, seventh, and tenth of the twelve strain gauges 208. Thus, each set of torque sensors includes four strain gauges 208. Further, each strain gauge in the second set of torque sensors is 30 degrees ahead of an adjacent strain gauge in the first set of torque sensors, and each strain gauge in the third set of torque sensors is 30 degrees behind an adjacent strain gauge in the first set of torque sensors.

Further, the four strain gauges 208 included in each set of torque sensors constitute a Wheatstone bridge to form a detection circuit to measure the torque transmitted by the harmonic drive 100 during rotation of the flexible spline 106.

Similarly, the strain gage 208 may be, for example, a Rosette-type strain gage. As described above, by using twelve strain gauges and arranging them centrally and symmetrically, the influence of the torque ripple in the signals measured by the torque sensors can be effectively eliminated, whereby the measurement sensitivity can be effectively improved, and thus the accuracy of the measurement can be improved. Further, the strain gauges 208 may also be made of, for example, polyvinylidene fluoride (PVDF), or may be made of other materials suitable for Hall sensors, capacitive sensors. Further, the strain gauges 208 may also be made, for example, by screen printing and then mounted on the harmonic drive 100. Alternatively, the strain gauges 208 may also be formed directly on the harmonic drive 100 by screen printing.

Similarly, the torque ripple contained in the signals measured by the first set of torque sensors, the second set of torque sensors, and the third set of torque sensors is related to the angle θ of the wave generator relative to the flexible spline, as shown in the following equation (1):

$$\tau_r = \tau_{pr} \cdot \sin(2\theta) \qquad \text{equation (1)}$$

where $\tau_r$ is a torque ripple contained in the signal measured by the first set of torque sensors (or the second set of torque sensors or the third set of torque sensors), and $\tau_{pr}$ is a torque ripple peak value in the torque ripple.

As described above, since the three sets of torque sensors are alternatively arranged at an angle of 30 degrees, there is a phase difference in the torque value measured by the strain gauges in the three sets of torque sensors. The torque values measured by the first set of torque sensors, the second set of torque sensors, and the third set of torque sensors are as shown in equations (6), (7), and (8) below, respectively, $$\tau_4 = \tau_o + \tau_r = \tau_o + \tau_{pr} \cdot \sin(2\theta) \quad \text{equation (6)}$$

$$\tau_5 = \tau_o + \tau_{r+30°} = \tau_o + \tau_{pr} \cdot \sin(2(\theta - 30°)) = \tau_o + \frac{1}{2}\tau_{pr} \cdot \sin(2\theta) - \frac{\sqrt{3}}{2}\tau_{pr} \cdot \cos(2\theta) \quad \text{equation (7)}$$

$$\tau_6 = \tau_o + \tau_{r-30°} = \tau_o + \tau_{pr} \cdot \sin(2(\theta + 30°)) = \tau_o + \frac{1}{2}\tau_{pr} \cdot \sin(2\theta) + \frac{\sqrt{3}}{2}\tau_{pr} \cdot \cos(2\theta) \quad \text{equation (8)}$$

where $\tau_4$ is a torque value measured by the first set of torque sensors, $\tau_5$ is a torque value measured by the second set of torque sensors, $\tau_6$ is a torque value measured by the third set of torque sensors, and $\tau_o$ is an output torque value of the harmonic drive.

It should be note that, the angle $\theta$ herein is a relative angle between the wave generator and the flexible spline obtained by taking a position of any strain gauge in the first set of torque sensors as the reference point on the flexible spline and taking a point on a long axis of the elliptical wave generator as the reference point. In a condition that other points on the wave generator and the flexible spline are selected as reference points in practical applications, the above-mentioned equation will be adjusted accordingly, but the principle thereof is not changed, and the principle and spirit of the present disclosure can still be applied.

Thereafter, the processor calculates a real torque transmitted by the harmonic drive based on torque values measured by the first set of torque sensors, the second set of torque sensors, and the third set of torque sensors, and the real torque can contain no torque ripples. Specifically, $\tau_o$ can be calculated by the following equation (9) based on the above-mentioned equations (6), (7) and (8).

$$\tau_o = \tau_5 + \tau_6 - \tau_4 \quad \text{equation (9)}$$

Further, in this embodiment, it is considered that there is a position error between the three sets of torque sensors. That is, it is assumed that after arranging the second set of torque sensors and the third set of torque sensors, they have angular deviations of $\Delta\alpha$ and $\Delta\beta$ from the first set of torque sensors, respectively. Therefore, if the second set of torque sensors is $30°+\Delta\alpha$ earlier than the first set of torque sensors and the third set of torque sensors is $30°+\Delta\beta$ later than the first set of torque sensors, the torque values measured by the second set of torque sensors and the third set of torque sensors are as shown in equations (10) and (11) below; respectively:

$$\tau_{5'} = \tau_o + \tau_{r+30°} = \tau_o + \tau_{pr} \cdot \sin(2(\theta - (30° + \Delta\alpha))) \quad \text{equation (10)}$$

$$\tau_{6'} = \tau_o + \tau_{r-30°} = \tau_o + \tau_{pr} \cdot \sin(2(\theta + (30° + \Delta\beta))) \quad \text{equation (11)}$$

where $\tau_{5'}$ is a torque value measured by the second set of torque sensors and $\tau_{6'}$ is a torque value measured by the third set of torque sensors.

$\tau_o$ can be calculated by the following equation (12) based on the above-mentioned equations (6), (10) and (11).

$$\tau_o = \tau_4 - \tau_{pr} \cdot \sin(2\theta) = \tau_4 - \left(\frac{\tau_4 - \tau_{5'}}{\sin(2\theta) - \sin(2(\theta - (30° + \Delta\alpha)))} \text{ or } \frac{\tau_4 - \tau_{6'}}{\sin(2\theta) - \sin(2(\theta + (30° + \Delta\beta)))}\right)\sin(2\theta) \quad \text{equation (12)}$$

Further, in this embodiment, it is also possible to eliminate the high-frequency measurement signal components by using a Kalman filter, thereby correcting errors and further improving the measurement accuracy.

Furthermore, in other embodiments of the present disclosure, the harmonic drive may also include a circuit board to which the plurality sets of torque sensors may be electrically connected. The circuit board is, for example, provided on a side of the flexible spline away from the toothed part, and is fixedly connected to the flexible spline by, for example, bolting or gluing, thereby being capable of rotating with the flexible spline. Further, on the circuit board, the processor for calculating a real torque, a memory for recording data related to an output torque, and the like may be mounted.

Figure 7:
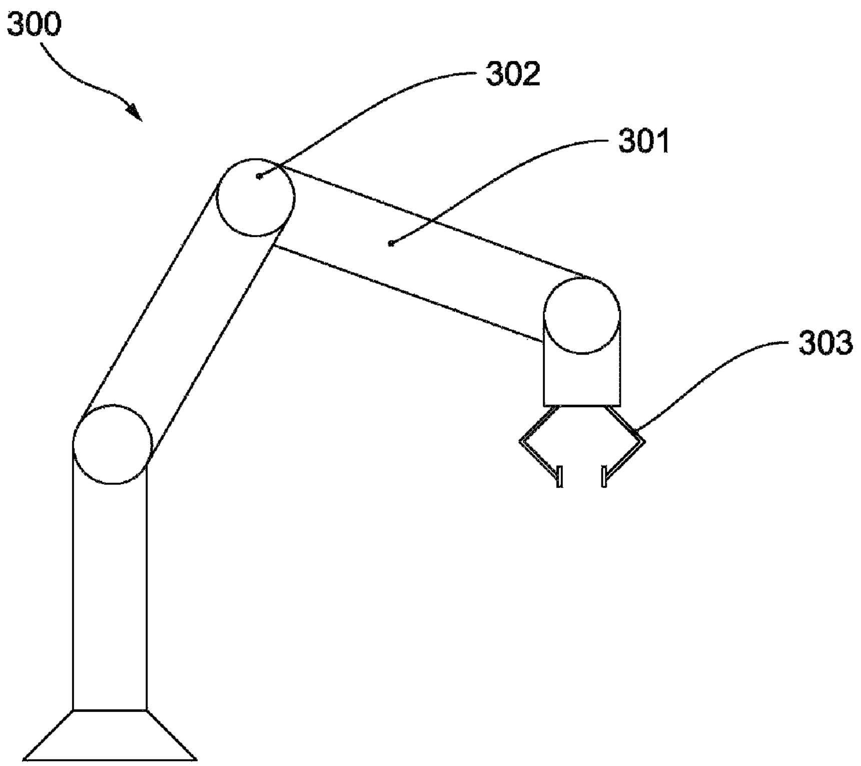
FIG. 7 is a schematic structural view of a robot according to an embodiment of the present disclosure.

In addition, another aspect of the present disclosure provides a robot joint and a robot. Referring now to FIG. 7, a robot joint and a robot according to an embodiment of the present disclosure will be described. As shown, the robot 300 may include a plurality of connecting arms 301, any adjacent two connecting arms 301 are pivotally connected by respective robot joints 302, which may employ the harmonic drive as described above. The robot 300 further includes a robot clamping jaw 303. One end of the robot clamping jaw 303 is connected to a corresponding connecting arm 301, and the other end of the robot clamping jaw 303 is provided with one or more gripping means. Thus, the robot 300 can be used to clamp or grip objects. It will be understood by those skilled in the art that the structure shown in FIG. 7 is merely an exemplary embodiment of the robot 300. In other embodiments, the robot 300 may include more or fewer components, such as additional connecting arms and end effectors. Some components (e.g., two or more connecting arms) may be combined, and components of a different or additional type than those depicted may be employed. For example, the robot may also include an I/O device, a network access device, a communication bus, a processor, a memory, an actuator, and a sensor to enable control of the system. For example, the robot 300 may include a processor and a memory that stores instructions that, when executed by the processor, enable the processor to control the system. The memory may also store instructions that, when executed by the processor, enable the processor to activate or deactivate the robot clamping jaw 303 to grip or release articles to be clamped.

In description of the present disclosure, it should be understood that orientation or positional relationships represented by directional terms, such as "central", "longitudinal", "lateral", "length", "width", "thickness", "up", "down", "front", "rear", "left", "right", "vertical", "horizontal", "top", "bottom", "inside", "outside", "clockwise", "anticlockwise", "axial", "radial", "circumferential" etc., are orientation or positional relationships based on the drawings, and are merely for the convenience of describing the present disclosure and simplifying the description, rather than indicating or implying that the device or element is intended to have a particular orientation, or is constructed and operated in a particular orientation, and therefore, should not be interpreted as a limitation of the present disclosure.

In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the present disclosure, "a plurality of" means more than two, unless otherwise specifically defined.

In the present disclosure, unless otherwise clearly specified and limited, the terms "installed", "connected", "connected", "fixed" and other terms should be understood in a broad sense, for example, it can be a fixed connection or a detachable connection, or it can be integrated; it can be mechanically connected or electrically connected; it can be directly connected or indirectly connected through an intermediary, it can be the internal communication of two components or the interaction relationship between two components, unless otherwise specifically limited. For those skilled in the art, the specific meanings of the above terms in the present disclosure can be understood according to specific circumstances.

The technical features of the above-described embodiments can be combined arbitrarily. To simplify the description, not all possible combinations of the technical features in the above embodiments are described. However, all of the combinations of these technical features should be considered as within the scope of the present disclosure, as long as such combinations do not contradict with each other.

The foregoing embodiments are merely some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A harmonic drive, comprising:

a wave generator;

a circular spline provided with internal teeth;

a flexible spline provided between the wave generator and the circular spline and configured to be engaged with the internal teeth of the circular spline;

a plurality sets of torque sensors, wherein each set of the torque sensors comprises a plurality of strain gauges, each set of the torque sensors is respectively configured to measure torque transmitted by the harmonic drive during rotation of the flexible spline, wherein signals measured by each set of torque sensors comprise a torque ripple, and the plurality sets of torque sensors are alternatively arranged, the plurality of strain gauges in each set of the torque sensors are sequentially arranged along a circumferential direction of the flexible spline, adjacent two strain gauges belong to different sets, and the plurality of strain gauges in different sets of the torque sensors are equally spaced, the plurality of sets of torque sensors comprising a first set of torque sensors comprising four strain gauges and a second set of torque sensors comprising four strain gauges, the strain gauges in the first set of torque sensors and the strain gauges in the second set of torque sensors alternatively arranged at an angle of 45 degrees;

an angle measuring device configured to measure an angle of the wave generator relative to the flexible spline during rotation of the flexible spline; and a processor configured to calculate a true torque transmitted by the harmonic drive based on signals measured by the plurality sets of torque sensors, wherein the torque ripple is excluded from the true torque, wherein the processor calculates the true torque according to the following equation:

$$\tau_o = \frac{(\tau_1 + \tau_2)}{1 - \tan(2\theta)}$$

where $\tau_o$ is the true torque transmitted by the harmonic drive, $\tau_1$ is a torque value measured by the first set of torque sensors, $\tau_2$ is a torque value measured by the second set of torque sensors, and $\theta$ is the angle of the wave generator relative to the flexible spline.

2. The harmonic drive according to claim 1, wherein the angle measuring device comprises a first angle sensor configured to measure an angle of the wave generator relative to the circular spline during rotation of the flexible spline, and a second angle sensor configured to measure an angle of the flexible spline relative to the circular spline during rotation of the flexible spline, such that the angle measuring device is capable of measuring the angle of the wave generator relative to the flexible spline during rotation of the flexible spline.

3. The harmonic drive according to claim 1, wherein the plurality sets of torque sensors comprises a first set of torque sensors, a second set of torque sensors, and a third set of torque sensors, the first set of torque sensors comprises four strain gauges, the second set of torque sensors comprises four strain gauges, and the third set of torque sensors comprises four strain gauges, the strain gauges in the first set of torque sensors, the strain gauges in the second set of torque sensors, and the strain gauges in the third set of torque sensors are alternatively arranged at an angle of 30 degrees, wherein each strain gauge in the second set of torque sensors is arranged 30 degrees ahead of an adjacent strain gauge in the first set of torque sensors, and each strain gauge in the third set of torque sensors is arranged 30 degrees behind an adjacent strain gauge in the first set of torque sensors.

4. The harmonic drive according to claim 3, wherein the processor calculates the true torque according to the following equation:

$$\tau_o = \tau_5 + \tau_6 - \tau_4$$

where $\tau_o$ is the true torque transmitted by the harmonic drive, $\tau_4$ is a torque value measured by the first set of torque sensors, $\tau_5$ is a torque value measured by the second set of torque sensors, $\tau_6$ is a torque value measured by the third set of torque sensors, and $\tau_o$ is an output torque value of the harmonic drive.

5. The harmonic drive according to claim 3, wherein the processor calculates the true torque according to the following equation:

$$\tau_o = \tau_4 - \tau_{pr} \cdot \sin(2\theta) = \tau_4 - \left(\frac{\tau_4 - \tau_{5'}}{\sin(2\theta) - \sin(2(\theta - (30^\circ + \Delta\alpha)))}\right. \text{ or}$$

-continued $$\left.\frac{\tau_4 - \tau_6}{\sin(2\theta) - \sin(2(\theta + (30^\circ + \Delta\beta)))}\right)\sin(2\theta)$$

where $\tau_o$ is the true torque transmitted by the harmonic drive, $\tau_4$ is a torque value measured by the first set of torque sensors, $\tau_{5'}$ is a torque value measured by the second set of torque sensors, $\tau_{6'}$ is a torque value measured by the third set of torque sensors, $\Delta\alpha$ is an angular deviation between the second set of torque sensors and the first set of torque sensors, and $\Delta\beta$ is an angular deviation between the third set of torque sensors and the first set of torque sensors.

6. The harmonic drive according to claim 1, wherein each set of torque sensors is provided on the flexible spline and arranged surrounding an axis of the flexible spline.

7. The harmonic drive according to claim 6, wherein the flexible spline comprises:

a body part;

a toothed part provided at one end of the body part and configured to be engaged with the internal teeth of the circular spline; and a flange extending radially outwardly from an end of the body part opposite the toothed part, wherein the plurality sets of torque sensors are provided on at least one of an inner side of the flexible spline, an outer side of the body part, a side of the flange facing the toothed part, and a side of the flange away from the toothed part.

8. A robot comprising a plurality of connecting arms, any adjacent two connecting arms being pivotally connected by a robot joint, wherein the robot joint comprises a harmonic drive according to claim 1.

9. A method of measuring torque in a harmonic drive, wherein the harmonic drive comprises:

a wave generator;

a circular spline provided with internal teeth;

a flexible spline provided between the wave generator and the circular spline and configured to be engaged with the internal teeth of the circular spline;

a plurality sets of torque sensors, wherein each set of torque sensors comprises a plurality of strain gauges, and the plurality sets of torque sensors are alternatively arranged, the plurality of strain gauges in each set of the torque sensors are sequentially arranged along a circumferential direction of the flexible spline, adjacent two strain gauges belong to different sets, and the plurality of strain gauges in different sets of the torque sensors are equally spaced, the plurality of sets of torque sensors comprising a first set of torque sensors comprising four strain gauges and a second set of torque sensors comprising four strain gauges, the strain gauges in the first set of torque sensors and the strain gauges in the second set of torque sensors alternatively arranged at an angle of 45 degrees;

an angle measuring device configured to measure an angle of the wave generator relative to the flexible spline during rotation of the flexible spline; and a processor, wherein the method comprises the following steps of:

measuring torque transmitted by the harmonic drive during rotation of the flexible spline by each set of torque sensors, wherein signals measured by each set of torque sensors comprise a torque ripple; and calculating, by the processor, a true torque transmitted by the harmonic drive based on the signals measured by the plurality sets of torque sensors, wherein the torque ripple is excluded from the true torque, wherein the processor calculates the true torque according to the following equation:

$$\tau_o = \frac{(\tau_1 + \tau_2)}{1 - \tan(2\theta)}$$

where $\tau_o$ is the true torque transmitted by the harmonic drive, $\tau_1$ is a torque value measured by the first set of torque sensors, $\tau_2$ is a torque value measured by the second set of torque sensors, and $\theta$ is the angle of the wave generator relative to the flexible spline.

10. The method according to claim 9, wherein the angle measuring device comprises a first angle sensor configured to measure an angle of the wave generator relative to the circular spline during rotation of the flexible spline, and a second angle sensor configured to measure an angle of the flexible spline relative to the circular spline during rotation of the flexible spline, such that the angle measuring device is capable of measuring the angle of the wave generator relative to the flexible spline during rotation of the flexible spline.

11. The method according to claim 9, wherein the plurality sets of torque sensors comprise a first set of torque sensors, a second set of torque sensors, and a third set of torque sensors, the first set of torque sensors comprises four strain gauges, the second set of torque sensors comprises four strain gauges, and the third set of torque sensors comprises four strain gauges, the strain gauges in the first set of torque sensors, the strain gauges in the second set of torque sensors, and the strain gauges in the third set of torque sensors are alternatively arranged at an angle of 30 degrees, wherein each strain gauge in the second set of torque sensors is arranged 30 degrees ahead of an adjacent strain gauge in the first set of torque sensors, and each strain gauge in the third set of torque sensors is arranged 30 degrees behind an adjacent strain gauge in the first set of torque sensors.

12. The method according to claim 11, wherein the processor calculates the true torque according to the following equation:

$$\tau_o = \tau_5 + \tau_6 - \tau_4$$

where $\tau_o$ is the true torque transmitted by the harmonic drive, $\tau_4$ is a torque value measured by the first set of torque sensors, $\tau_5$ is a torque value measured by the second set of torque sensors, $\tau_6$ is a torque value measured by the third set of torque sensors, and $\tau_o$ is an output torque value of the harmonic drive.

13. The method according to claim 11, wherein the processor calculates the true torque according to the following equation:

$$\tau_o = \tau_4 - \tau_{pr} \cdot \sin(2\theta) = \tau_4 - \left(\frac{\tau_4 - \tau_{5'}}{\sin(2\theta) - \sin(2(\theta - (30^\circ + \Delta\alpha)))} \text{ or } \frac{\tau_4 - \tau_{6'}}{\sin(2\theta) - \sin(2(\theta + (30^\circ + \Delta\beta)))}\right)\sin(2\theta)$$

where $\tau_o$ is the true torque transmitted by the harmonic drive, $\tau_4$ is a torque value measured by the first set of torque sensors, $\tau_{5'}$ is a torque value measured by the second set of torque sensors, $\tau_{6'}$ is a torque value measured by the third set of torque sensors, $\Delta\alpha$ is an angular deviation between the second set of torque sensors and the first set of torque sensors, and $\Delta\beta$ is an angular deviation between the third set of torque sensors and the first set of torque sensors.

14. The method according to claim 9, wherein each set of torque sensors is provided on the flexible spline and arranged surrounding an axis of the flexible spline.

* * * * *